United States Patent Office 3,794,606
Patented Feb. 26, 1974

3,794,606
COMPOSITION OF A POLYPHENYLENE ETHER AND AN ACRYLIC RESIN MODIFIED POLYISOPRENE
James G. Bennett, Menands, N.Y., and Robert M. Summers, Arlington, Mass., assignors to General Electric Company
No Drawing. Filed Nov. 1, 1971, Ser. No. 194,520
Int. Cl. C08c 9/14; C08d 9/08
U.S. Cl. 260—4 R              13 Claims

ABSTRACT OF THE DISCLOSURE

There are provided compositions comprising (a) a polyphenylene ether in combination with a styrene resin and (b) an interpolymerization product of an acrylic ester with a polyisoprene. The addition of the interpolymerized acrylic ester-polyisoprene to compositions of polyphenylene ethers and polystyrenes provides unexpected improvements in toughness in parts molded from the compositions, and in their resistance to gasoline. Such properties are improved with substantial enhancement in gloss and surface appearance.

---

This invention relates to novel resin compositions and more particularly, to polymer compositions comprising a polyphenylene ether in combination with a polystyrene resin and a resinous interpolymerization product of an acrylic ester with a polyisoprene.

BACKGROUND OF THE INVENTION

The polyphenylene ethers are known and described in numerous publications including Hay, U.S. 3,306,874 and 3,306,875 and Stamatoff, U.S. 3,257,357 and 3,257,358. The high molecular weight polyphenylene ethers are high performance engineering thermoplastics possessing relatively high melt viscosities and softening points—i.e., in excess of 275° C., and are useful for many commercial applications requiring high temperature resistance including formation of films, fibers and molded articles.

Although they have the above-described desirable properties, it is also known that certain properties of the polyphenylene ether resins are undesirable for some commercial uses. For example, parts molded from the polyphenylene ethers are somewhat brittle due to poor impact strength. In addition, the relatively high melt viscosities and softening points are considered a disadvantage for many uses. Films and fibers can be formed from polyphenylene ether resins on a commercial scale using solution techniques, but melt processing is commercially unattractive because of the high temperatures required to soften the resin and the problems associated therewith such as instability, discoloration and the requirement for specially designed process equipment to operate at elevated temperatures. Molded articles can be formed by melt processing techniques, but, again, the high temperatures required are undesirable.

It is known in the art that properties of the polyphenylene ether resins can be materially altered by blending them with other resins. For example, one method for improving the melt processability of the polyphenylene ethers is disclosed in a commonly-assigned patent, U.S. 3,379,792, incorporated herein by reference. According to this patent, flow properties of the polyphenylene ethers are improved by blending with from about 0.1 to 25 parts by weight of a polyamide. In another commonly-assigned patent, U.S. 3,361,851, a polyphenylene ether composition comprising a polyphenylene ether blended with a polyolefin is disclosed. The polyolefin is added to improve impact strength and resistance to aggregessive solvents. In a third commonly-assigned patent, Cizek, U.S. 3,383,435, there are provided means for simultaneously improving the melt processability of the polyphenylene ether resins while simultaneously up-grading many properties of polystyrene resins. The invention of the Cizek patent is based upon the discovery that the polyphenylene ether resins and polystyrene resins, including modified polystyrene resins, are combinable in all proportions and result in compositions having many properties improved over those of either of the components.

One preferred embodiment of the Cizek patent is a composition comprising a high-impact, butadiene rubber reinforced polystyrene and a poly(2,6-dialkyl-1,4-phenylene)ether. This composition was preferred because it provided the aforementioned objectives of improving the melt-processability properties of the polyphenylene ether resin and provided the further advantage of improving impact resistance of parts molded from the blend. Furthermore, the Cizek composition of the polyphenylene ether and the butadiene rubber reinforced high impact polystyrene could be custom-formulated to provide predetermined properties ranging between those of the polystyrene and those of the polyphenylene ether by controlling the ratio of the two polymers. The reason for this is that the blend exhibits a single set of thermodynamic properties rather than two distinct sets of properties—i.e., one for each of the components of the blend as is typical with blends of prior art.

With respect to the preferred embodiments in the Cizek patent, it is believed that the impact resistance of the polyphenylene ethers is improved because of the butadiene rubber content in the high-impact polystyrene and, in this respect, the improvement in impact strength appears to be directly proportional to the butadiene rubber content of the polystyrene resin, increasing concentrations of butadiene rubber resulting in increased impact strength. However, it has also been found—as a disadvantage—that the gloss of parts molded from the polyphenylene ether resin and the butadiene rubber modified high-impact polystyrene is inversely proportional to the butadiene rubber content and that, therefore, as the butadiene rubber content is increased, gloss and surface appearance of the molded parts are decreased. Consequently, increasing the butadiene rubber content of the compositions results in increased impact strength, but with a sacrifice in surface appearance and gloss. Alternatively, reduction in butadiene rubber content such as by the use of unreinforced (crystal) polystyrene results in parts having good gloss, but at a sacrifice in impact strengths. Because both impact strength and gloss are commercially important properties in the manufacture of molded parts, although the preferred compositions of the Cizek patent provide the advantages noted above, it has been found difficult to provide compositions having both optimum impact strength and surface appearance.

In addition, although the polyphenylene ether-styrene resin compositions of the Cizek patent can be improved in resistance to aggressive organic solvents by copolymerization of the styrene resin with an alkenyl cyanide, e.g., acrylonitrile, the need still exists for compositions with outstanding resistance to gasoline.

It has also been proposed to enhance the impact resistance of polyphenylene ethers, alone or in combination with styrene resins, by including in such compositions, interpolymerization products of acrylic monomers and the butadiene or rubbery styrene butadiene copolymers disclosed in the Cizek compositions. Although impact strength is markedly improved, the surface appearance, i.e., gloss, and resistance to aggressive solvents, e.g., gasoline, are still somewhat less than desired.

It has now been discovered that an interpolymer of an alkyl methacrylate and cis-1,4-polyisoprene (in contrast to the polybutadienes used heretofore) provides a dramatic improvement in impact strength when compounded with polyphenylene ether combinations with polystyrenes especially rubber modified polystyrene resins. The very high impact strengths cannot be explained solely on the basis of rubber content, but appears to be due to a cooperation between all of the components.

A surprising improvement in surface appearance, i.e., gloss is noted after adding an acrylic resin modified polyisoprene, too. In the prior compositions, for example, there is little or no effect on gloss and, in some cases, an actual sacrifice of this commercially important property is required to obtain optimum toughness.

The resistance to aggressive solvents of compositions containing polyphenylene ether, polystyrene and an acrylic ester modified polyisoprene is also surprisingly improved and outstanding. No failure is observed even after 60 minutes in gasoline at 1% strain. In contrast, many of the prior art compositions show stress cracks in less than one minute.

The new compositions can also be reinforced with fibrous glass with enhancement in physical properties and no loss of excellent resistance to gasoline environments. In addition the new compositions have unusually good resistance to distortion by heat.

DESCRIPTION OF THE INVENTION

According to the present invention there are provided normally solid thermoplastic compositions comprising (a) A polyphenylene ether resin and a styrene resin in combination, and (b) A resinous interpolymerization product comprising a poly(alkyl methacrylate) and a rubbery cis-1,4-polyisoprene, component (b) being present in an amount of from about 5 to about 50% by weight of the total resinous components of the composition.

Preferred compositions will be those in which the polyphenylene ether comprises at least 1% by weight of the total resinous components in the composition.

It is to be understood, however, that the present compositions can also include conventional amounts of conventional additives for processability, flame retardancy, stability and the like.

Preferred features of this invention are reinforced compositions containing reinforcing amounts of reinforcements, such as powders, whiskers, fibers or platelets of metals, e.g., aluminum, bronze, iron or nickel, and nonmetals, e.g., carbon filaments, acicular $CaSiO_3$, asbestos, $TiO_2$, titanate whiskers, glass flakes and fibers and the like. Such reinforcements will be present in an amount of, e.g., 2 to 90% by weight, preferably 10 to 60% by weight. Especially preferred as a reinforcement is fibrous glass.

In preferred compositions the polyphenylene ether resins in component (a) will be those having repeating structural units of the formula

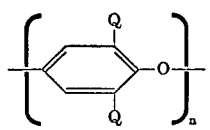

wherein the oxygen ether atom of one unit is connected to the benzene nucleus of the next adjoining unit, $n$ is a positive interger and is at least 50, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in the above-mentioned patents of Hay and Stamatoff. Especially preferred polyphenylene ether resins for purposes of the present invention are those having alkyl substitution in the two positions ortho to the oxygen ether atom—i.e., where each Q is alkyl, most preferably, having from 1 to 4 carbon atoms. The most preferred polyphenylene ether resin for purposes of the present invention is poly(2,6-dimethyl-1,4-phenylene) ether (each Q is methyl).

With respect to component (b), alkyl acrylate interpolymerization products with cis-,4-polyisoprene are made by means well known to those skilled in the art. Interpolymerization products are grafted or similarly chemically combined compositions of alkyl acrylates and the polyisoprenes, in contrast to the so-called polyblends or mechanical combinations described in the prior art. Suitable alkyl acrylates are, e.g., (lower)alkyl esters of acrylic and methacrylic acids, e.g., methyl, ethyl and butyl acrylate and methacrylates, preferably methyl methacrylate. Suitable sources of cis-1,4-polyisoprene are natural rubber, either in the latex or coagulated form and also "synthetic" natural rubber, prepared by polymerization of isoprene in the presence of catalysts, e.g., lithium metal, which lead to stereo regularity in the desired cis-1,4 configuration. Natural rubber is preferred. It is essential that the cis-1,4-polyisoprene used to prepare the interpolymers not contain a substantial portion of the trans-1,4-configuration—otherwise the present advantages will not be obtained. Therefore, it will not be suitable to use gutta percha, a type of natural polyisoprene which has a large proportion of trans-1,4 bonding, or emulsion polymerized isoprene, in which a substantial amount of the configuration is other than the required cis-1,4 type.

The acrylate ester is preferably interpolymerized by grafting onto the cis-1,4-polyisoprene backbone. This may be done by well known techniques, in emulsion, suspension, bulk, and a similar systems. By way of illustration, using an ammoniated natural rubber latex, additional soap can be added, then the latex is swelled with a solution of an initiator, e.g., benzoyl peroxide or cumyl hydroperoxide in an alkyl acrylate, e.g., methyl methacrylate. On raising the temperature of the emulsion, preferably in the absence of oxygen, polymerization is initiated with the formation of poly alkyl acrylate grafted side chains on the polyisoprene. On the other hand, in a typical bulk polymerization procedure, 100 parts of natural rubber (coagulated from the latex) is mixed with 100 parts of methyl methacrylate and 0.5 part of benzoyl peroxide and 0.5 part of dimethyl aniline. The temperature rises from 25 to 85° C. during which polymerization proceeds to 50 percent completion. Then 0.2 part of azobis-isobutyronitrile is added and polymerization is completed. Such interpolymers can be made with any desired amount of poly(acrylate) grafting but, preferably, to retain full advantage of the elastomeric backbone, the interpolymer will contain no more than about 50% by weight of methacrylate and preferably from about 20 to about 50% by weight of methyl methacrylate and about 80 to 50% by weight of cis-1,4-polyisoprene.

Methods for preparing interpolymerization products useful for this invention are disclosed in Encyclopedia of Polymer Science and Technology, vol. 2, Interscience, 1965, p. 488, and references cited therein; Ham, Copolymerization, vol. 18, Interscience, 1964, p. 357, and references cited therein; Bloomfield et al., Proceedings of the Third Rubber Technology Conference (London), Heffer and Sans, 1954, p. 185; and Swift, J. Appl. Chem., 8, 803 (1958).

A detailed procedure will be given hereinafter.

Such interpolymers are also available commercially under the designations Haveatuf latices and chips (coagulated dewatered latices) from the Haveatex Division of the Firestone Tire and Rubber Company.

As noted above, the acrylic resin-modified polyisoprene is combined with a composition of a polyphenylene ether resin in combination with a polystyrene and most preferably, a high impact polystyrene resin. As disclosed in the above-mentioned Cizek patent, the styrene resin most combinable with the polyphenylene ether resin is one having at least 25% by weight polymer units derived from a vinyl aromatic monomer having the formula:

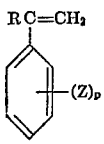

where R is hydrogen, alkyl of 1 to 4 carbon atoms or halogen; Z is a member selected from the class consisting of vinyl, hydrogen, or alkyl of from 1 to 4 carbon atoms; and $p$ is from 1 to 5. Such compositions will comprise from 1 to 99% by weight of the polyphenylene ether component and from 99 to 1% by weight of the polystyrene resin. The preferred styrene resin for purposes of this invention is one comprising a rubber modified polystyrene, e.g., blended or grafted with from about 3 to 30, preferably from 4 to 12% by weight of a polybutadiene or a rubbery copolymer, e.g., of about 70% BD and 30% styrene. Although with un-modified polystyrenes, e.g., crystal polystyrene, the compositions have superior gloss and solvent resistance, the improvement in impact strength is not nearly so marked unless the styrene resin is rubber modified.

The amount of the interpolymer of alkyl acrylate and cis-1,4-polyisoprene added to the polyphenylene ether resin combination with polystyrene resin may vary within rather broad limits, but preferably ranges from about 5 to 50% by weight of the resinous components.

In a preferred family of compositions the polyphenylene ether comprises from about 1 to about 95% by weight, the interpolymer of acrylate and polyisoprene (b) comprises from about 5 to about 50% by weight, and the styrene resin component comprises from 1 up to the remainder by weight of the total weight of the resinous components in said composition. Especially preferred are compositions in which the polyphenylene ether is poly-(2,6-dimethyl-1,4-phenylene)ether and comprises from about 20 to about 95% by weight, component (b) is an interpolymer of poly(methyl methacrylate), and natural rubber and comprises from about 5 to about 50% by weight and the styrene resin component is a rubber modified polystyrene and comprises from 1 up to about 75% by weight of the total weight of the resinous components in the blend.

It should be obvious that other additives may be present in the compositions such as plasticizers, pigments, flame retardants and stabilizers in amounts varying between about 1 and 30 percent by weight of the total composition. The above-stated range for the interpolymer of polyacrylate and polyisoprene and the polyphenylene ether resin in combination with the polystyrene resin, is based solely upon such resinous components in the polymer blend and excludes other additives.

The method of forming the polymer composition is not critical, prior art blending techniques being available. For example, one such method comprises blending the polymers and additives, such as reinforcements in powder, granular and filamentous form—as the case may be—extruding the blend and chopping into pellets suitable for molding to shape by means conventionally used to mold normally solid thermoplastic compositions.

In another method, the interpolymer of acrylic ester and polyisoprene in the form of an aqueous latex is added directly to a solution of the polyphenylene ether, e.g., in toluene, the resins are precipitated, e.g., by adding methanol, and the precipitate, after drying is further mixed by extrusion or co-extrusion with a styrene resin.

In still another method, the interpolymer of acrylic ester and polyisoprene, e.g., in the form of dewatered latex chips, is swelled in a hydrocarbon, e.g., toluene, which also contains the polyphenylene ether resin. The resinous components in such a mixture are the precipitated, e.g., with an alcohol, then further mixed by extrusion, during which the polystyrene resin can be added by co-extrusion.

The following procedure illustrates a method whereby an acrylic resin-modified polyisoprene interpolymer composition suitable for use in the compositions of this invention can be prepared.

One hundred parts of an ammoniated natural rubber latex (cis-1,4-polyisoprene) is adjusted to 50 wt. percent solids, then is diluted with 100 parts of water containing 1.5 parts of sodium lauryl sulfate dissolved therein. The latex is agitated until homogeneous. Twenty one and four-tenths parts of methyl methacrylate monomer containing 0.15 part of benzoyl peroxide and 1.32 parts of n-dodecylmercaptan are added to the diluted latex slowly with stirring to obtain a uniform stable emulsion. The emulsion is maintained at 60° C. for 18 hours to effect essentially complete polymerization.

The product is a latex of an interpolymerization product containing 30% by weight of poly(methyl methacrylate) and 70% by weight of natural rubber. It can be added directly to polyphenylene ether solution, and after the resinous components are precipitated, e.g., by adding methanol, the styrene resin is added and the resulting composition according to this invention is obtained.

Alternatively, the latex solids can be coagulated by slowly pouring the product into about 1500 parts of a 0.5% aqueous calcium chloride solution (containing an antioxidant, if desired) at 90° C. The coagulated product can be filtered, washed and dried and used in the compositions of this invention. The dried, coagulated product can also be milled and chipped before mixing with polyphenylene ether resins and polystyrene resin.

The ratio of methacrylate monomer to cis-1,4-polyisoprene backbone can be varied by adjusting the above recipe according to procedures understood by those skilled in the art.

DESCRIPTION OF THE PREFERRED EMBODIMENTS

The advantages obtained by providing compositions of acrylic resin modified polyisoprene rubbers with a polyphenylene ether resin in combination with a styrene resin are illustrated in the following examples which are set forth as further description of the invention, but are not to be construed as limiting the invention thereto.

EXAMPLE 1

The latex and solution ingredients in the following formulation are mixed, the resinous components are precipitated with methanol and filtered, then co-extruded with the styrene resin and 1 phr. (part per hundred of resin) of tridecylphosphate at temperatures of 450° F., die; 550° F., middle; and 450° F., rear, then molded into test pieces in a 3 oz. Newbury injection molding machine, at 430° F., stock; 150° F., mold; and 550° F., injection, temperatures. The physical tests are carried out by the following procedures: ⅛" notched Izod impact strength, ASTM D-256-56; heat distortion temperature at 264 p.s.i., ASTM D-648-56; tensile strength and elongation, ASTM D-638-61T. Gloss is measured at a 45° angle. The physical properties are as follows.

Ingredients (parts by weight (solids basis)):
- Poly(2,6-dimethyl-1,4-phenylene)ether [1] _____ 45
- 20/80 - poly(methyl methacrylate)interpolymer with cis-1,4-polyisoprene [2] _____ 10
- Polybutadiene rubber modified polystyrene resin [3] 45

Properties:
- Izod impact (ft.-lbs./in. notch) _____ 6.3
- Tensile yield strength (p.s.i.) _____ 7785
- Elongation, percent _____ 33

[1] General Electric Company, PPO., intrinsic viscosity 0.40 to 0.65 dl./g. (as a 10% by weight solution in toluene).
[2] Haveatuf P-1320L, Firestone Tire and Rubber Co., containing about 20% by weight of poly(methyl methacrylate) interpolymer with 80% by weight of natural rubber (in latex form 50% by weight solids content).
[3] Cosden 825 TV, Cosden Chemical Co., containing about 8% by weight of polystyrene-grafted polybutadiene rubber.

A very high impact strength composition, with excellent tensile elongation properties is provided.

EXAMPLE 2

The following formulation is blended, molded and tested by the procedure of Example 1. The property test data are as follows.

Ingredients (parts by weight (solids basis)):
- Poly(2,6-dimethyl-1,4-phenylene)ether (as in Example 1) _____ 40
- 40/60 - poly(methyl methacrylate)interpolymer with cis-1,4-polyisoprene [1] _____ 10
- Polybutadiene rubber modified polystyrene resin (as in Example 1) _____ 50

Properties:
- Izod impact (ft.-lbs./in. notch) _____ 8.4
- Heat distortion temperature, °F. _____ 222
- Tensile yield strength, p.s.i. _____ 7200
- Tensile ultimate strength, p.s.i. _____ 6300
- Elongation, percent _____ 72
- 45° gloss value _____ 63.4

[1] Haveatuf P-1340L, Firestone Tire and Rubber Company, containing about 40% by weight of poly(methyl methacrylate) interpolymer with 60% by weight of natural rubber (in latex form, 50% by weight solids content).

There is obtained a very high impact strength composition with excellent gloss.

EXAMPLE 3

The following formulation is blended, molded and tested by the procedure of Example 1. The property test data are as follows.

Ingredients (Parts by weight (solids basis)):
- Poly(2,6-dimethyl-1,4-phenylene) ether (as in Example 1) _____ 40
- 20/80-poly(methyl methacrylate) interpolymer with cis-1-4-polyisoprene (as in Example 1) _____ 10
- Polybutadiene rubber modified polystyrene resin (as in Example 1) _____ 50

Properties:
- Izod impact (ft.-lbs./in. notch) _____ 8.9
- Heat distortion temperature, °F. _____ 226
- Tensile yield strength, p.s.i. _____ 6900
- Tensile ultimate strength, p.s.i. _____ 6000
- Elongation, percent _____ 71
- 45° gloss value _____ 62.4

A composition having very high impact strength and excellent surface appearance is obtained.

EXAMPLE 4

The following formulation is blended, molded, and tested by the procedure of Example 1. The property test data are as follows:

Ingredients (Parts by weight (solids basis)):
- Poly(2,6-dimethyl-1,4-phenylene) ether (as in Example 1) _____ 20
- 20/80-poly(methyl methacrylate) interpolymer with cis-1,4-isoprene (as in Example1) _____ 9
- Polybutadiene modified polystyrene resin (as in Example 1) _____ 71

Properties:
- Izod impact (ft.-lbs./in. notch) _____ 2.7
- Tensile yield strength, p.s.i. _____ 6600
- Tensile ultimate strength, p.s.i. _____ 5600
- Elongation, percent _____ 31
- 45° gloss value _____ 54.1

Even with a relatively low amount of acrylic interpolymer, the impact strength is good and the surface appearance is outstanding.

EXAMPLE 5

The following formulation is blended, molded and tested by the procedure of Example 1. The property test data are as follows.

Ingredients (Parts by weight (solids basis)):
- Poly(2,6-dimethyl-1,4-phenylene) ether (as in Example 1) _____ 45
- 20/80-poly(methyl methacrylate) interpolymer with cis-1,4-polyisoprene (as in Example 1) _____ 10
- Crystal homopolystyrene [1] _____ 45

Properties:
- Izod impact (ft.-lbs./in. notch) _____ 1.0
- Tensile yield strength, p.s.i. _____ 8700
- Tensile ultimate strength, p.s.i. _____ —
- Elongation, percent _____ 8

[1] Koppers Company, Dylene-8.

Although the impact strength is not enhanced, surface appearance is excellent and, as well be seen later, resistance to gasoline is outstanding.

EXAMPLE 6

The following formulation is blended, molded and tested by the procedure of Example 1. The property test data are as follows.

Ingredients (Parts by weight (solids basis)):
- Poly(2,6-dimethyl-1,4-phenylene) ether (as in Example 1) _____ 20
- 20/80-poly(methyl methacrylate) interpolymer with cis-1,4-polyisoprene (as in Example 1) _____ 9
- Crystal homopolystrene (as in Example 5) _____ 71

Properties:
- Izod impact (ft.-lbs./in. notch) _____ 0.5
- Tensile yield strength (p.s.i.) _____ 9900
- Elongation, percent _____ 10

Although the impact strength is not enhanced, surface appearance is excellent and, as will be seen later, gasoline resistance is outstanding.

EXAMPLE 7

The following formulation is prepared by first swelling the acrylic-natural rubber interpolymer in about 150 parts by volume of toluene for 48 to 72 hours, then adding the polyphenylene ether resin and stirring until homogeneous. Enough methanol is then added to precipitate all of the resinous components, they are collected and vacuum dried. Then the polystyrene resin is mixed in, with 1 phr. of tridecyl phosphite, and the composition is coextruded with styrene resin and injection molded under the conditions set forth in Example 1. The property test data are as follows.

Ingredients (parts by weight):
  Poly(2,6-dimethyl-1,4-phenylene) ether [1] ____ 20
  30/70 - poly(methyl methacrylate) interpolymer with cis-1,4-polyisoprene [2] _____ 8
  Polybutadiene rubber modified polystyrene (as in Example 1) _____ 72
Properties:
  Izod impact (ft.-lbs./in. notch) _____ 3.7
  Tensile yield strength (p.s.i.) _____ 6300
  Tensile ultimate strength (p.s.i.) _____ 5500
  Elongation, percent _____ 28
  45° gloss value _____ 52.6

[1] General Electric Company, PPO in powder form, intrinsic viscosity 0.40-0.65 dl./g.
[2] Haveatuf 1330 Chip, Firestone Tire and Rubber Company, containing about 30% by weight of poly(methyl methacrylate) interpolymer with about 70% by weight of natural rubber (from dewatered latex, in chip form).

Similarly to compositions prepared from latex, the properties of this composition show high impact strength, excellent tensile and elongation and outstanding surface appearance.

EXAMPLE 8

The following formulation is blended, molded and tested by the procedure of Example 7. The property test data are as follows.

Ingredients (parts by weight):
  Poly(2,6-dimethyl - 1,4 - phenylene) ether (as in Example 7) _____ 40
  40/60 - poly(methyl methacrylate) interpolymer with cis-1,4-polyisoprene [1] _____ 10
  Polybutadiene rubber modified polystyrene (as in Example 1) _____ 50
Properties:
  Izod impact (ft.-lbs./in. notch) _____ 7.5
  Heat distortion temperature, °F. _____ 234
  Tensile yield strength (p.s.i.) _____ 7900
  Tensile ultimate strength (p.s.i.) _____ 6300
  Elongation, percent _____ 43
  45° gloss value _____ 60.5

[1] Haveatuf 1340 Chip, Firestone Tire and Rubber Co., containing about 40% by weight of poly(methyl methacrylate) interpolymer with about 60% by weight of natural rubber (from dewatered latex, in chip form).

A composition is provided with outstanding impact strength, excellent tensile and elongation and excellent surface appearance.

EXAMPLE 9

The following formulation is blended, molded and tested by the procedure of Example 7. The property test data are as follows.

Ingredients (parts by weight):
  Poly(2,6-dimethyl - 1,4 - phenylene) ether (as in Example 7) _____ 20
  30/70 - poly(methyl methacrylate) interpolymer with cis - 1,4 - polyisoprene (as in Example 7) _____ 8
  Crystal homopolystyrene (as in Example 5) _ 72
Properties:
  Izod impact (ft.-lbs./in. notch) _____ 0.5
  Tensile yield strength (p.s.i.) _____ 8800
  Elongation, percent _____ 7

Although there is no substantial improvement in impact strength, surface appearance is excellent and, as will be shown later, solvent resistance is outstanding.

EXAMPLE 10

The following formulation is blended, molded and tested by the procedure of Example 7. The property test data are as follows.

Ingredients (parts by weight):
  Poly(2,6-dimethyl - 1,4 - phenylene) ether (as in Example 7) _____ 40
  40/60 - poly(methyl methacrylate) interpolymer with cis - 1,4 - polyisoprene (as in Example 8) _____ 10
  Crystal homopolystyrene (as in Example 5) __ 50
Properties:
  Izod impact (ft.-lbs./in. notch) _____ 0.8
  Tensile yield strength (p.s.i.) _____ 9900
  Elongation, percent _____ 12
  45° gloss value _____ 66.1

Surface appearance is outstanding and, as will be shown later, solvent resistance is outstanding.

COMPARATIVE EXAMPLES A-C

For comparison purposes, compositions comprising a polyphenylene ether and a polystyrene resin, which do not contain the acrylic modified polyisoprene, are prepared and tested. Comparative Example A corresponds to Example 1; Comparative Example B corresponds to Example 2; and Comparative Example C corresponds to Example 4. The property test data are as follows.

|  | Parts by weight | | |
|---|---|---|---|
|  | A | B | C |
| Ingredients: | | | |
| Poly(2,6-dimethyl-1,4-phenylene)ether (as in Examples 1, 2 and 4) | 45 | 40 | 20 |
| Polybutadiene rubber modified polystyrene (as in Examples 1, 2 and 4) | 55 | 60 | 80 |
| Properties: | | | |
| Izod impact (ft. lbs./in. notch) | 2.5 | 2.3 | 1.2 |
| Heat distortion temperature, °F., at 264 p.s.i | 270 | 250 | |
| Tensile yield strength (p.s.i.) | 10,900 | 9,500 | 6,600 |
| Tensile ultimate strength (p.s.i.) | | 8,000 | 6,300 |
| Elongation, percent | 33 | 26 | 16 |
| 45° gloss value | | 43.4 | 51.3 |

With respect to A, in comparison with its counterpart, Example 1, the impact strength is much lower and surface appearance is poorer. With respect to B, in comparison with its counterpart, Example 2, the impact strength and elongation are much lower and the surface appearance is very much poorer. With respect to C, in comparison with its counterpart, Example 4, the impact strength and elongation are much poorer, and the surface appearance is decreased. In all cases, as will be shown, the resistance to gasoline is substantially decreased in comparison with the counterparts containing acrylic modified polyisoprene.

EXAMPLE 11

The following formulation is blended, molded and tested by the procedure of Example 1.

Ingredients (parts by weight):
  Poly(2,6 - dimethyl - 1,4 - phenylene)ether (as in Example 1) _____ 45
  20/80 - poly(methyl methacrylate) interpolymer with cis-1,4-polyisoprene (as in Example 1) __ 10
  Polybutadiene rubber modified polystyrene (as in Example 1) _____ 25
  Fibrous glass reinforcement _____ 20

The reinforced composition has high impact strengths and tensile elongations, good surface appearance and excellent resistance to aggressive solvents.

To determine the environmental craze resistance to the present compositions, test pieces are placed under a 1% strain and immersed in gasoline at about 70° F. The results are summarized in Table 1.

TABLE 1

[Resistance to stress cracking and crazing in gasoline of polyphenylene ether resins combined with acrylic resin—modified polyisoprenes]

| Example | Composition (parts by weight) | | Time to failure in gasoline at 1% strain |
|---|---|---|---|
| 1 | PPO [1] | 45 | >60 min. |
|   | 20/80 PMMA-PISOP [2] | 10 | |
|   | PBD-PS [3] | 45 | |
| 2 | PPO | 40 | >60 min. |
|   | 40/60 PMMA-PISOP | 10 | |
|   | PBD-PS | 50 | |
| 3 | PPO | 40 | >60 min. |
|   | 20/80 PMMA-PISOP | 10 | |
|   | PBD-PS | 50 | |
| 4 | PPO | 20 | >60 min. |
|   | 20/80 PMMA-PISOP | 9 | |
|   | PBD-PS | 71 | |
| 5 | PPO | 45 | >60 min. |
|   | 20/80 PMMA-PISOP | 10 | |
|   | Crystal-PS [4] | 45 | |
| 7 | PPO | 20 | >60 min. |
|   | 30/70 PMMA-PISOP | 8 | |
|   | PBD-PS | 72 | |
| 8 | PPO | 40 | >60 min. |
|   | 40/60 PMMA-PISOP | 10 | |
|   | PBD-PS | 50 | |
| 9 | PPO | 20 | >60 min. |
|   | 30/70 PMMA-PISOP | 8 | |
|   | Crystal-PS | 72 | |
| 10 | PPO | 40 | >60 min. |
|   | 40/60 PMMA-PISOP | 10 | |
|   | Crystal-PS | 50 | |
| A | PPO | 45 | 20 sec. |
|   | PBD-PS | 55 | |
| B | PPO | 40 | 20 sec. |
|   | PBD-PS | 60 | |
| C | PPO | 20 | 20 sec. |
|   | PBD-PS | 80 | |

[1] Poly(2,6-dimethyl-1,4-phenylene)ether.
[2] Poly(methyl methacrylate) interpolymer with cis-1,4-polyisoprene.
[3] Polybutadiene rubber modified polystyrene.
[4] Crystal homopolystyrene.

With all of the compositions, containing acrylic resin modified polyisoprene according to this invention (Examples 1–10), no crazing or cracking occurs even after sixty minutes, when testing is terminated, demonstrating excellent resistance to this aggressive solvent.

In contrast, the materials prepared for comparison purposes—without acrylic resin modified polyisoprene (Examples A, B and C), all have very limited resistance to gasoline, and fail in only 20 seconds.

EXAMPLE 12

The procedure of Example 8 is repeated, substituting, respectively for the acrylic resin-modified natural rubber interpolymer one having a rubbery stereoregular, lithium catalyzed cis-1,4-polyisoprene backbone, and for the polybutadiene rubber modified high impact polystyrene resin, a rubbery butadiene-styrene copolymer (78% BD-22% styrene) modified polystyrene. A composition according to this invention is obtained. Similarly, for the poly(methyl methacrylate)-modified natural rubber latex, there can be substituted cis-1,4-polyisoprene latices modified, respectively, with poly(methyl acrylate) and poly(butyl methacrylate).

EXAMPLE 13

The following polyphenylene ethers are substituted for poly(2,6-dimethyl-1,4-phenylene)ether in the formulation of Example 1.

poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether;
poly(2-ethyl-6-propyl-1,4-phenylene)ether.

Compositions according to this invention are obtained.

Obviously, other modifications and variations of the present invention are possible in the light of the above teachings. It is, therefore, to be understood that changes may be made in the particular embodiments of the invention described which are within the full intended scope of the invention as defined by the appended claims.

What is claimed is:
1. A normally solid thermoplastic composition comprising
(a) from about 1 to about 95% by weight of a polyphenylene ether resin and from about 99 to about 5% by weight of a styrene resin in combination; and
(b) a product consisting essentially of from about 20 to about 50% by weight of a poly(alkyl methacrylate) grafted onto from about 80 to about 50% by weight of a rubbery cis-1,4-polyisoprene backbone, component (b) being present in an amount of from about 5 to about 50% by weight of the total resinous components of the composition, said styrene resin having at least 25% of the polymer units derived from a vinyl aromatic compound of the formula

$$RC=CH_2$$
$$\bigcirc\!\!\!\!-(Z)_p$$

wherein R is hydrogen, alkyl of from 1 to 4 carbon atoms or halogen, Z is hydrogen, alkyl of from 1 to 4 carbon atoms or vinyl and $p$ is an integer of from 1 to 5.

2. A composition as defined in claim 1 wherein the polyphenylene ether resin in component (a) is of the formula $$\left[\begin{array}{c} Q \\ \bigcirc\!\!\!\!\!-O \\ Q \end{array}\right]_n$$

wherein the oxygen ether atom of one unit is connected to the benzene nucleus of the next adjoining unit; $n$ is an integer of at least 50; and each Q is a monovalent substituent selected from hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

3. A composition as defined in claim 2 wherein each Q is alkyl having from 1 to 4 carbon atoms.

4. A composition as defined in claim 2 wherein each Q is methyl.

5. A composition as defined in claim 1 wherein component (b) is a grafted interpolymer of methyl methacrylate with natural rubber.

6. A composition as defined in claim 1 wherein component (b) contains from about 20 to about 50% by weight of poly(methyl methacrylate) and from about 80 to about 50% by weight of cis-1,4-polyisoprene.

7. A composition as defined in claim 6 wherein the cis-1,4-polyisoprene is natural rubber.

8. A composition as defined in claim 6 wherein component (b) is methyl methacrylate grafted onto a natural rubber latex.

9. A composition as defined in claim 1 wherein component (a) comprises
(i) from 1 to 95% by weight of a polyphenylene ether of the formula $$\left[\begin{array}{c} Q \\ \bigcirc\!\!\!\!\!-O \\ Q \end{array}\right]_n$$

wherein Q is alkyl of from 1 to 4 carbon atoms and $n$ is an integer of at least 50; and (ii) from 99 to 5% by weight of a styrene resin having at least 25% of the polymer units derived from a vinyl aromatic compound of the formula

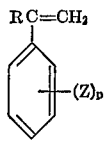

wherein R is hydrogen, alkyl of from 1 to 4 carbon atoms or halogen, Z is hydrogen, alkyl of from 1 to 4 carbon atoms or vinyl and $p$ is an integer of from 1 to 5.

10. A composition as defined in claim 9 wherein the styrene resin is a rubber modified styrene resin, said rubber comprising a diene rubber or a rubbery copolymer of butadiene and styrene in an amount of from about 4 to about 12% by weight of said resin.

11. A composition as defined in claim 9 wherein the polyphenylene ether is poly(2,6-dimethyl-1,4-phenylene) ether.

12. A composition as defined in claim 1 wherein said polyphenylene ether is poly(2,6-dimethyl-1,4-phenylene) ether and comprises from about 20 to about 95% by weight said styrene resin comprises from about 80 to about 5% by weight of said combination, component (b) is an interpolymer of poly(methyl methacrylate) and natural rubber and comprises from about 5 to about 50% by weight of the total resinous components in the combination and the styrene resin component is a rubber modified polystyrene.

13. A reinforced composition as defined in claim 1 including a reinforcing amount of fibrous glass.

References Cited
UNITED STATES PATENTS

| | | | |
|---|---|---|---|
| 3,663,661 | 5/1972 | Katchman | 260—876 R |
| 3,487,127 | 12/1969 | Erchak et al. | 260—876 R |
| 3,637,545 | 1/1972 | Fivel | 260—4 R |
| 3,383,435 | 5/1968 | Cizek | 260—874 |

JOHN C. BLEUTGE, Primary Examiner

U.S. Cl. X.R.

260—30.6 R, 41.5 R, 876 R